United States Patent [19]

Peterson et al.

[11] Patent Number: 5,309,271
[45] Date of Patent: May 3, 1994

[54] THIN FILM MULTISTABLE ANGULAR OPTICAL SWITCH

[75] Inventors: Phillip R. Peterson; Athanasios Gavrielides, both of Albuquerque, N. Mex.

[73] Assignee: The United States of America as represented by the Secretary of the Air Force, Washington, D.C.

[21] Appl. No.: 637,739

[22] Filed: Jan. 7, 1991

[51] Int. Cl.$^5$ .......................... G02F 1/03; G02F 1/07; G02F 1/00
[52] U.S. Cl. .................... 359/241; 359/299; 359/254; 359/258; 359/321
[58] Field of Search ............... 350/354, 355, 356, 377, 350/380, 395; 359/241, 299, 254, 258, 321

[56] References Cited

U.S. PATENT DOCUMENTS

| | | | |
|---|---|---|---|
| 3,864,043 | 2/1975 | Russell | 356/152 |
| 4,330,211 | 5/1982 | Peterson et al. | 356/354 |
| 4,797,552 | 1/1989 | Steel et al. | 250/251 |
| 4,840,483 | 6/1989 | Hafffner | 356/153 |

OTHER PUBLICATIONS

U. J. Schmidt; "Electro-optic deflection of a laser beam" Philips Tech. Review vol. 36, No. 5, pp. 117–132 (1976).
"Transverse Electric Field Scattering by a Kerr Media Deposited on a Conducting Planar Surface," Peterson et al, J. Appl. Phys. 68(2), 446 (Jul. 15, 1990).

*Primary Examiner*—Eugene R. LaRoche
*Assistant Examiner*—Evelyn A. Lester
*Attorney, Agent, or Firm*—Bobby D. Scearce; Donald J. Singer

[57] ABSTRACT

An intensity sensitive optical switch is described which comprises a nonlinear thin film Kerr material deposited on a conducting surface.

7 Claims, 1 Drawing Sheet

THIN FILM MULTISTABLE ANGULAR OPTICAL SWITCH

RIGHTS OF THE GOVERNMENT

The invention described herein may be manufactured and used by or for the government of the United States for all governmental purposes without the payment of any royalty.

BACKGROUND OF THE INVENTION

The present invention relates generally to optical switching devices, and more particularly to an optical switching device sensitive to changes in incident laser intensity.

The invention is an optical switching device capable of detecting small angular deviations in the propagation direction of a laser beam by measuring large changes in reflected intensity. The device comprises a nonlinear thin film Kerr material deposited on a conducting surface. When the device is properly aligned, it operates about a characteristic critical angle. The function of the device relies on nonlinear optical phenomena manifested by operation near a condition of bistability for a constant input intensity. If an incident beam wanders from this condition, the accompanying small angular deviation results and a precipitous change in reflected intensity occurs. The change in intensity is detectable by conventional means and may be used to realign the beam.

It is therefore a principal object of the invention to provide an improved optical switch.

It is a further object of the invention to provide an optical switch for laser beam alignment and control.

It is a further object of the invention to provide a device for sensing deviations in laser beam alignment.

It is a further object of the invention to provide a laser intensity sensitive optical switch.

These and other objects of the invention will become apparent as a detailed description of representative embodiments proceeds.

SUMMARY OF THE INVENTION

In accordance with the foregoing principles and objects of the invention, an intensity sensitive optical switch is described which comprises a nonlinear thin film Kerr material deposited on a conducting surface.

DESCRIPTION OF THE DRAWINGS

The invention will be more clearly understood from the following detailed description of representative embodiments thereof read in conjunction with the accompanying drawings wherein.

DETAILED DESCRIPTION

Theoretical considerations related to the operation of the optical switch of the invention and numerical solutions to equations describing the operation thereof are presented in Peterson et al, "Transverse Electric Field Scattering by a Kerr Media Deposited on a Conducting Planar Surface", J App Phys 68, 446 (7/15/90), the background material and entire teachings presented therein being incorporated by reference herein.

Figure 1:
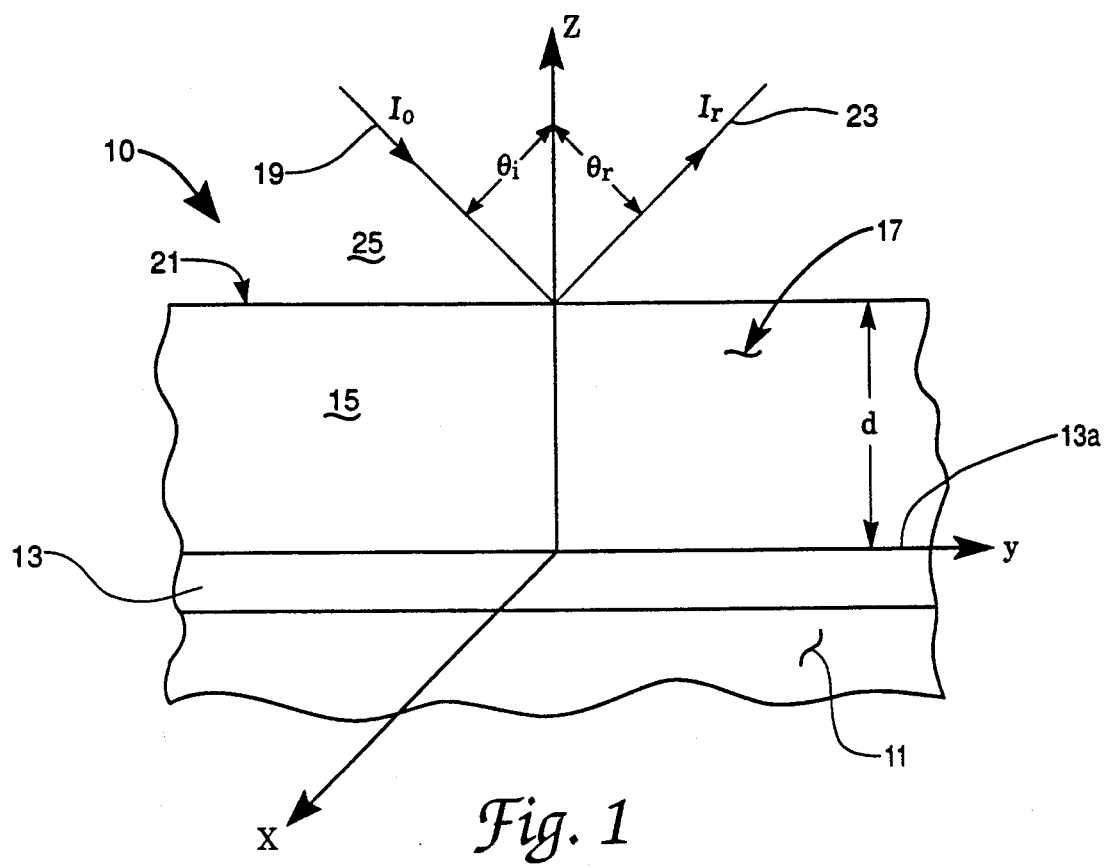
FIG. 1 is a diagram of an optical switch of the invention illustrating the geometry of incident and reflected laser beams.

Referring now to the drawings, FIG. 1 shows a schematic view in section of a layered structure representative of an optical switch 10 of the invention. Switch 10 may include substrate 11 of suitable non-conducting material such as wood, glass or plastic for supporting a conducting layer 13 of suitable conductor such as gold, silver or aluminum. Substrate 11 may not be needed where conducting layer 13 has suitable structural strength or is otherwise supported as would occur to a skilled artisan guided by these teachings. Gold may be a preferable choice for conducting layer 13 because at the wavelengths of interest in the functioning of switch 10 (viz., 500 to 600 microns), gold has an index of refraction of about 0.0873 and an extinction coefficient of about 1.9852 (a measure of how far the electric field of the incident radiation can penetrate the gold layer). Thickness of conducting layer 13 may preferably be in the range of 5000 to 6000 microns, depending on conductor material selection, this range being the preferable thickness for gold. Conducting layer 13 may be deposited by any suitable method resulting in a smooth even surface 13a, the deposition method for conducting layer 13 therefore not being limiting of the invention.

Layer 15 of a non-linear Kerr medium 17 is deposited on conducting layer 13 to a thickness d of about 500 to 1500 microns. Medium 17 may comprise substantially any non-linear Kerr medium such as carbon disulfide or nitrobenzene, or a liquid crystal such as MBBA (p-methoxybenzylidene-p'-butylaniline).

Figure 2:
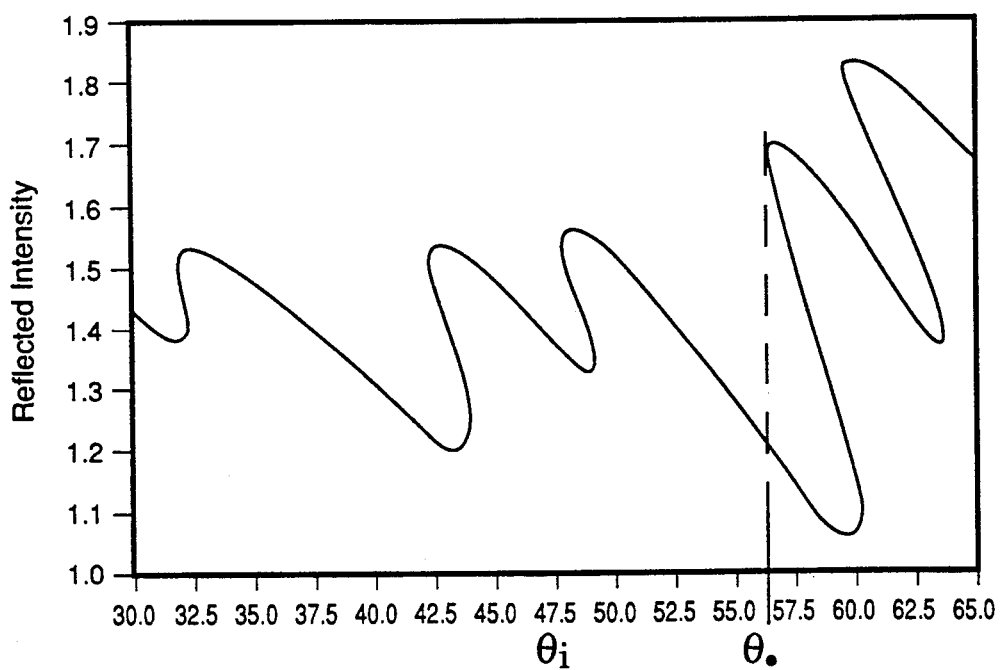
FIG. 2 is a plot of incident angle versus reflected intensity for a representative switch of the invention.

Operation of switch 10 can be best described by reference to FIG. 1 and consideration of the interaction with switch 10 of a laser beam 19 of intensity $I_o$ incident through medium 25 of refractive index $n_l$ onto surface 21 at an angle of incidence $\theta_i$ near a characterisitic operating incidence angle $\theta_o$. Reflected beam 23 of intensity $I_r$ exhibits the angular multistable behavior such as illustrated in FIG. 2 depending on the selected non-linear Kerr medium 17, as explained in detail in Peterson et al, supra. The behavior of reflected beam 23 as exemplified in FIG. 2, shows that as incidence angle $\theta_i$ is changed with fixed incident intensity in a medium 17 of carbon disulfide deposited on a layer 13 of gold, the reflected intensity varies substantially and predictably characteristic of the refractive index of medium 17. For the example shown in FIG. 2, if incidence angle $\theta_i$ changes from an operating angle $\theta_o$ to a slightly smaller angle of incidence, a corresponding precipitous decrease in reflected intensity results. At this region of operation, switch 10 may operate as an angular on/off switch.

The invention can be used with a conventional feedback loop (not shown) to realign beam 19 to operating angle $\theta_o$ until the monitored reflected intensity returns to the original value. If an overshoot occurs, the switch may be controlled in iterative fashion until the desired operating angle $\theta_o$ is attained.

The invention therefore provides an intensity sensitive optical switch. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An intensity sensitive optical switch comprising:
   (a) a conducting layer of preselected thickness in the range of 5000 to 6000 microns, said conducting layer comprising a material selected from the group consisting of gold, silver and aluminum; and
   (b) a layer of nonlinear Kerr material of preselected thickness disposed on said conducting surface.

2. An intensity sensitive optical switch comprising:
   (a) a conducting layer of preselected thickness; and
   (b) a layer of nonlinear Kerr material of preselected thickness in the range of 500 to 1500 microns disposed on said conducting surface.

3. The switch of claim 1 further comprising a substrate supporting said conducting layer, said substrate comprising a non-conducting material selected from the group consisting of wood, glass and plastic.

4. The switch of claim 1 wherein said layer of nonlinear Kerr material comprises a material selected from the group consisting of carbon disulfide, nitrobenzene and p-methoxybenzylidene-p'-butylaniline.

5. The switch of claim 2 further comprising a substrate supporting said conducting layer, said substrate comprising a non-conducting material selected from the group consisting of wood, glass and plastic.

6. The switch of claim 2 wherein said conducting layer comprises a material selected from the group consisting of gold, silver and aluminum.

7. The switch of claim 2 wherein said layer of nonlinear Kerr material comprises a material selected from the group consisting of carbon disulfide, nitrobenzene and p-methoxybenzylidene-p'-butylaniline.

* * * * *